(12) United States Patent
Kawabata (10) Patent No.: US 8,988,737 B2
(45) Date of Patent: Mar. 24, 2015

(54) COMMUNICATION SYSTEM, RELAY DEVICE, AND RECORDING MEDIUM, PROVIDING COMMUNICATION BETWEEN THE RELAY DEVICE AND A CLIENT DEVICE VIA A PRIVATE NETWORK AND AN EXTERNAL DEVICE VIA A PUBLIC NETWORK

(71) Applicant: Fuji Xerox Co., Ltd., Tokyo (JP)

(72) Inventor: Hirotaka Kawabata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/940,779

(22) Filed: Jul. 12, 2013

(65) Prior Publication Data

US 2014/0233072 A1    Aug. 21, 2014

(30) Foreign Application Priority Data

Feb. 18, 2013    (JP) ................. 2013-029004

(51) Int. Cl.
| | | |
|---|---|---|
| *G06K 15/00* | (2006.01) | |
| *G06F 3/12* | (2006.01) | |
| *H04N 1/00* | (2006.01) | |
| *H04N 1/32* | (2006.01) | |

(52) U.S. Cl.
CPC .... *H04N 1/00209* (2013.01); *H04N 2201/0093* (2013.01); *H04N 1/0022* (2013.01); *H04N 1/32112* (2013.01); *H04N 2201/0075* (2013.01); *H04N 2201/3278* (2013.01); *H04N 2201/3214* (2013.01); *H04N 2201/3215* (2013.01); *H04N 2201/3216* (2013.01); *H04N 2201/3205* (2013.01); *H04N 2201/3209* (2013.01)
USPC .......... 358/407; 358/1.14; 358/1.15; 358/1.16

(58) Field of Classification Search
USPC ............. 358/407, 1.15, 1.16, 1.14, 440, 402, 358/403, 442, 405, 435, 468, 400, 476, 358/401; 370/353, 351, 357, 365, 370, 420, 370/422, 449, 451, 460, 463, 464, 466, 475, 370/492, 501; 379/100.02, 100.15, 100.09, 379/100.17, 108.02, 112.07, 4, 28, 32.01
See application file for complete search history.

(56) References Cited

U.S. PATENT DOCUMENTS

| | | | |
|---|---|---|---|
| 2002/0095506 A1* | 7/2002 | Tanimoto | 709/227 |
| 2004/0100648 A1* | 5/2004 | Kulakowski | 358/1.13 |
| 2007/0064952 A1* | 3/2007 | Takada et al. | 380/286 |
| 2009/0067414 A1* | 3/2009 | Toscano et al. | 370/353 |
| 2011/0235095 A1* | 9/2011 | Kudo et al. | 358/1.15 |

FOREIGN PATENT DOCUMENTS

| | | |
|---|---|---|
| JP | A-2002-185694 | 6/2002 |
| JP | A-2004-241870 | 8/2004 |

* cited by examiner

*Primary Examiner* — Ngon Nguyen
(74) *Attorney, Agent, or Firm* — Oliff PLC (57) ABSTRACT

A communication system includes a client device that does not include facsimile transmission functions, and a relay device. The relay device is communicably connected to the client device via a private network while also being communicably connected to an external device via a public network, includes facsimile transceiving functions that transmit and receive facsimiles via a public network line associated with the client device, and in response to facsimile transmission instructions for image information received from the client device via the private network, transmits to the external device a facsimile of the image information with added information on the public network line associated with the private network.

11 Claims, 11 Drawing Sheets

```
203c
FROM: 192.168.1.20  —203c1
TO: FAX = 0312345678@[192.168.1.33]
SUBJECT: iFax off ramp reqest
[BODY]
SOURCE RECORD = ATTACH
COVER SHEET = ATTACH    —203c2
(ATTACHED FILE FOLLOWS: MIME ENCODING)
....
```

FIG. 6C

| BOX NO. | FORWARDING IP ADDRESS |
|---|---|
| 010 | 192.168.1.25 |
| 020 | 192.168.1.20 |
| 030 | 192.168.1.30 |
| 040 | 192.168.1.40 |
| 050 | 192.168.1.45 |
| ... | ... |

111

| DID NO. | SORT BOX NO. |
|---|---|
| 045-XXXX-1111 | 010 |
| 045-XXXX-1112 | 050 |
| 045-XXXX-1113 | 030 |
| 045-XXXX-1114 | 020 |
| 045-XXXX-1115 | 040 |
| ... | ... |

112

FIG. 6D 01-02-13 12:34 ABCDEFG CO. 045-XXXX-1114 1/15  104a1  104a

103a

FAX COVER SHEET

TO: ABCDEFG CO.
ABCDEFG CO. SALES DIVISION 1
FROM: FXAT
ABC DEVELOPMENT DEPT.
FAX NO.: 045-XXXX-1114 — 103a1
PAGES: 015 (EXCLUDING THIS SHEET)
DATE: 01-02-2013 : 12:34
COMMENTS:

NY LIMITED
C CITY YYYY

```
                                                    203d
┌─────────────────────────────────────────────┐
│ FROM: 192.168.1.20 ──203d1                  │
│ TO: FAX = 0481230123@[192.168.1.33]         │
│ SUBJECT: iFax off ramp reqest               │
│ [BODY]                                       │
│ SOURCE RECORD = ATTACH  ──203d2             │
│ COVER SHEET = ATTACH            203d3       │
│ DESTINATION = ABCDEFG CO.                   │
│              ABCDEFG CO. SALES DIVISION 1   │
│ SOURCE = FXAT ABC DEVELOPMENT DEPT.         │
│ (ATTACHED FILE FOLLOWS: MIME ENCODING)      │
│ ....                                         │
└─────────────────────────────────────────────┘
```

FIG. 7C

| BOX NO. | FORWARDING IP ADDRESS |
|---|---|
| 010 | 192.168.1.25 |
| 020 | 192.168.1.20 |
| 030 | 192.168.1.30 |
| 040 | 192.168.1.40 |
| 050 | 192.168.1.45 |
| ... | ... |

111

| DID NO. | SORT BOX NO. |
|---|---|
| 045-XXXX-1111 | 010 |
| 045-XXXX-1112 | 050 |
| 045-XXXX-1113 | 030 |
| 045-XXXX-1114 | 020 |
| 045-XXXX-1115 | 040 |
| ... | ... |

103b — 104b₁: 01-02-13 12:34 — 104b₂: ABCDEFG CO. — 104b₃: 045-XXXX-1114 — 1/15 — 104b

FAX COVER SHEET
TO:   ABCDEFG CO.
      ABCDEFG CO. SALES DIVISION 1 — 103b₁
FROM: FXAT
      ABC DEVELOPMENT DEPT. — 103b₂
FAX NO.: 045-XXXX-1114 — 103b₃
PAGES:   015 (EXCLUDING THIS SHEET)
DATE:    01-02-2013 : 12:34 — 103b₄
COMMENTS:

NY LIMITED
C CITY YYYY

FIG. 8C 201c  202c1

01-02-13 12:34 ABCDEFG CO. 045-XXXX-1114 1/15  202c

FAX COVER SHEET

TO:      ABCDEFG CO.
         ABCDEFG CO. SALES DIVISION 1
FROM:    FXAT
         ABC DEVELOPMENT DEPT.
FAX NO.: 045-XXXX-1114  201c1
PAGES:   015 (EXCLUDING THIS SHEET)
DATE:    01-02-2013 : 12:34
COMMENTS:

NY LIMITED
C CITY YYYY

COMMUNICATION SYSTEM, RELAY DEVICE, AND RECORDING MEDIUM, PROVIDING COMMUNICATION BETWEEN THE RELAY DEVICE AND A CLIENT DEVICE VIA A PRIVATE NETWORK AND AN EXTERNAL DEVICE VIA A PUBLIC NETWORK

CROSS-REFERENCE TO RELATED APPLICATIONS

This application is based on and claims priority under 35 USC 119 from Japanese Patent Application No. 2013-029004 filed Feb. 18, 2013.

BACKGROUND

Technical Field

The present invention relates to a communication system, a relay device, and a recording medium.

SUMMARY

According to an aspect of the invention, there is provided a communication system that includes a client device that does not include facsimile transmission functions, and a relay device that is communicably connected to the client device via a private network while also being communicably connected to an external device via a public network, includes facsimile transceiving functions that transmit and receive facsimiles via a public network line associated with the client device, and in response to facsimile transmission instructions for image information received from the client device via the private network, transmits, by facsimile to the external device, the image information with added information on the public network line associated with the private network.

BRIEF DESCRIPTION OF THE DRAWINGS

Exemplary embodiments of the present invention will be described in detail based on the following figures, wherein.

DETAILED DESCRIPTION

[First Exemplary Embodiment]
(Configuration of Communication System)

Figure 1:
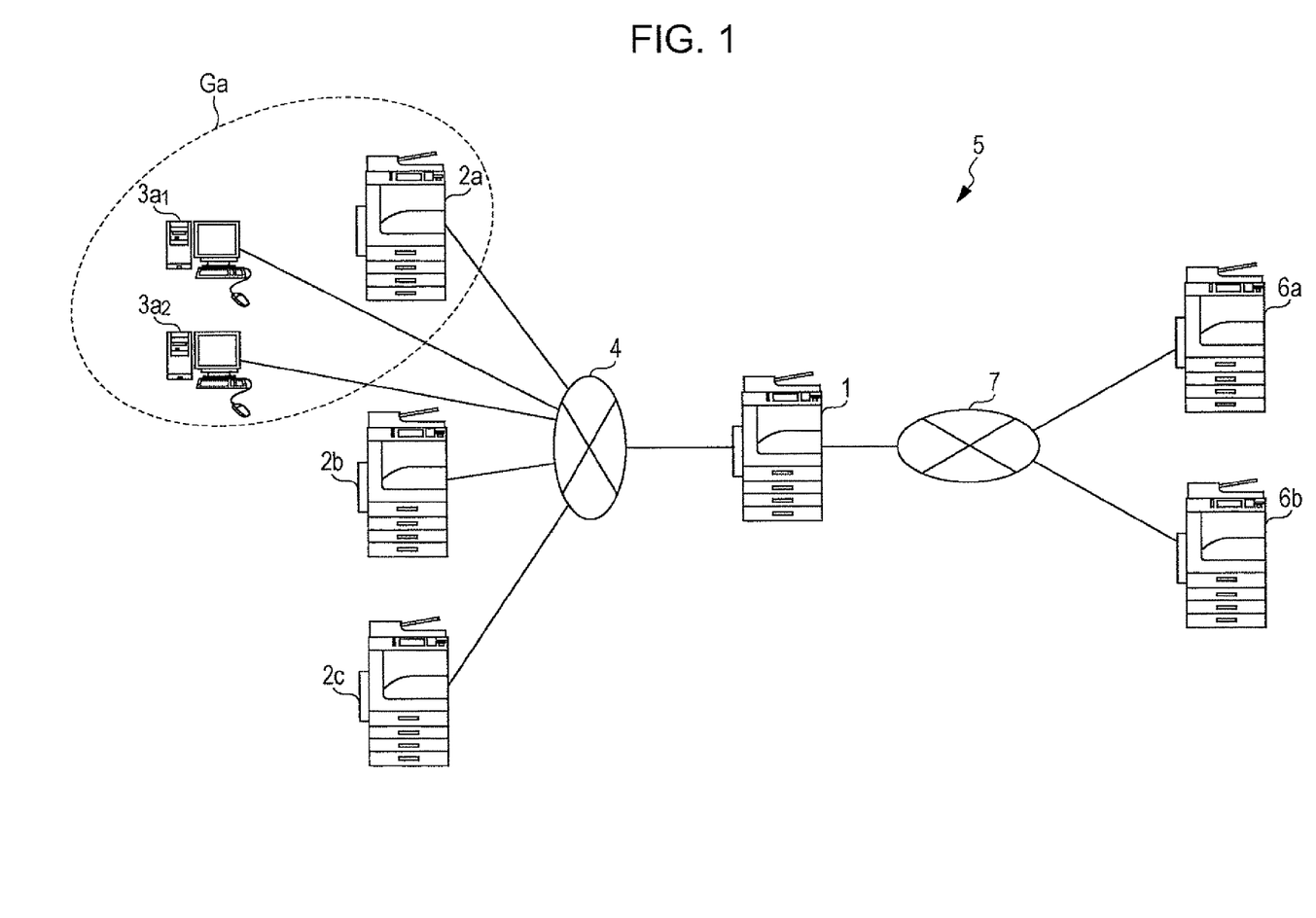
FIG. 1 is a schematic diagram illustrating an exemplary configuration of a communication system according to an exemplary embodiment of the present invention.

FIG. 1 is a schematic diagram illustrating an exemplary configuration of a communication system according to an exemplary embodiment of the present invention.

In the communication system 5, a relay device 1, client devices 2a to 2c, and PCs $3a_1$ and $3a_2$ are communicably connected to each other by a private network 4. In addition, the relay device 1 is communicably connected to external devices 6a and 6b via a public network 7, with information being transmitted and received between the external devices 6a and 6b primarily by facsimile (hereinafter called "fax"). Also, the client device 2a as well as the PCs $3a_1$ and $3a_2$ are grouped by reason of being installed on the same floor of the same building, for example, and are assumed to belong to a group Ga. Note that the group Ga will be described in detail in the fifth exemplary embodiment.

The relay device 1 is a device including fax transceiving functions as well as printer, scanner, and copier functions, and is equipped with electronic components such as a central processing unit (CPU) and flash memory that include functions for processing information. Although the relay device 1 is able to transmit a fax by itself, this exemplary embodiment will describe the case of transmitting a fax according to fax transmission instructions from the client devices 2a to 2c or the PCs $3a_1$ and $3a_2$ on the basis of the Internet Fax (iFax) standard.

The client devices 2a to 2c are devices including printer, scanner, and copier functions, but without fax transceiving functions, and are equipped with electronic components such as a CPU and flash memory that include functions for processing information. The client devices 2a to 2c issue fax transmission instructions to the relay device 1.

The PCs $3a_1$ and $3a_2$ issue fax transmission instructions to the relay device 1, similarly to the client devices 2a to 2c. Note that devices such as tablets and mobile phones, for example, may also be used as the PCs $3a_1$ and $3a_2$.

The private network 4 is a communication network capable of high-speed communication, and is a wired or wireless communication network such as an intranet or local area network (LAN).

The external devices 6a and 6b are arbitrary information processing devices that include fax transceiving functions, such as printers or PCs, for example.

The public network 7 is, for example, a paid communication network operated by a communication company, and may be an external network such as the public switched telephone network (PSTN) or an Integrated Services Digital Network (ISDN).

Figure 2:
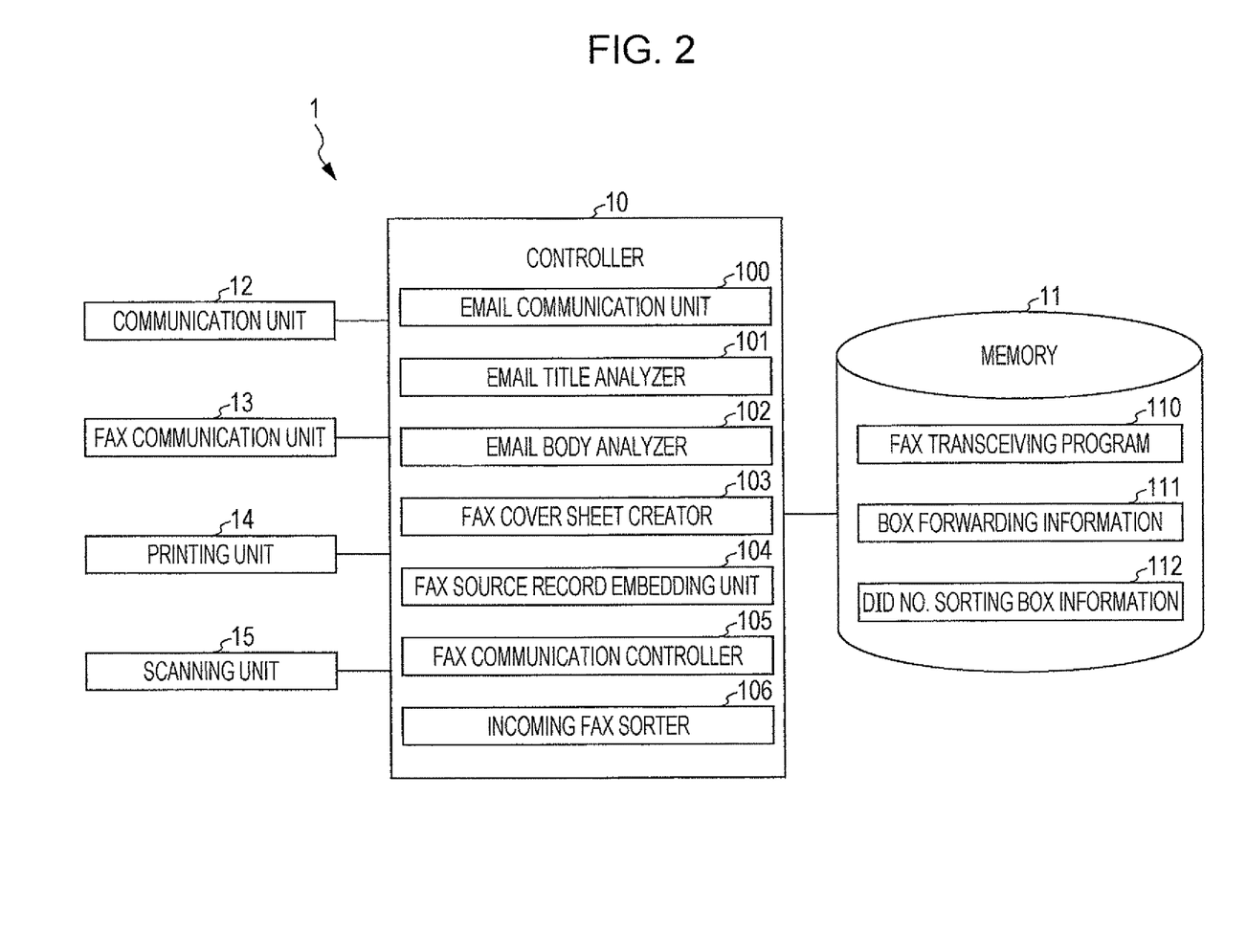
FIG. 2 is a block diagram illustrating an exemplary configuration of a relay device.

FIG. 2 is a block diagram illustrating an exemplary configuration of the relay device 1.

The relay device 1 is equipped with a controller 10, made up of a CPU or the like, that controls respective units in addition to executing various programs, memory 11 made up of a memory medium such as flash memory that stores information, a communication unit 12 that communicates with external devices via the private network 4, a fax communication unit 13 that communicates by fax with external devices via the public network 7, a printing unit 14 that prints onto a paper sheet, and a scanning unit 15 that optically scans a paper sheet having information such as text and images written thereon. The relay device 1 may additionally include a display that displays information such as text and images, and an operating unit used to operate the relay device 1.

By executing a fax transceiving program 110 discussed later, the controller 10 functions as an email communication unit 100, an email title analyzer 101, an email body analyzer 102, a fax cover sheet creator 103, a fax source record embedding unit 104, a fax communication controller 105, an incoming fax sorter 106, and the like.

The email communication unit 100 transmits and receives email to and from the client devices 2a to 2c as well as the PCs $3a_1$ and $3a_2$ via the private network 4. The email communication unit 100 also functions as a receiver that receives emails including iFax transmission instructions in particular.

The email title analyzer 101 analyzes the title of an email received by the email communication unit 100 to extract included information such as the destination of a fax transmission from iFax transmission instructions.

The email body analyzer 102 analyzes the body text of an email received by the email communication unit 100 to extract fax transmission settings, such as whether or not to add a source record, and whether or not to attach a cover sheet.

Note that a "source record" herein refers to information such as the phone number of the transmission source stated in a header or footer of the document to be faxed, while a "cover sheet" refers to separate sheet from the document to be faxed that states information such as the fax destination, the fax source, the source number, the number of pages to be transmitted, and the date and time of transmission.

The fax cover sheet creator 103 creates a cover sheet to attach to a document to be faxed, on the basis of analysis results from the email body analyzer 102.

The fax source record embedding unit 104 embeds information on the transmission source into the image information of the document to be faxed, on the basis of analysis results from the email title analyzer 101 or analysis results from the email body analyzer 102.

The fax communication controller 105 controls the fax communication unit 13 to transmit and receive faxes of image information forming a cover sheet and a document.

The incoming fax sorter 106 sorts image information forming a cover sheet and a document received via the fax communication unit 13 into a sorting box according to the destination of that document.

The memory 11 stores information such as the fax transceiving program 110 that causes the controller 10 to operate as the respective units 100 to 106 discussed above, box forwarding information 111, and direct inward dialing (DID) number sorting box information 112.

The box forwarding information 111 is information that associates identifiers for sorting boxes that temporarily save image information forming documents received as faxes with the IP addresses of forwarding destinations (the client devices 2a to 2c or the PCs $3a_1$ and $3a_2$) assigned to each sorting box. Note that sorting boxes are pre-created in memory not illustrated.

The DID number sorting box information 112 is information that associates phone numbers, which are destinations for image information forming documents received as faxes, with identifiers for sorting boxes. Note that this configuration assumes that multiple phone numbers are registered in DID format in a relay device, and that the registered numbers are respectively associated with the client devices 2a to 2c or the PCs $3a_1$ and $3a_2$.

The communication unit 12 transmits and receives data via the private network 4 according to a communication protocol such as TCP/IP, performing network-related control and controlling the transmitting and receiving of email.

The fax communication unit 13 includes the functionality of a modem that modulates and demodulates image data according to a facsimile protocol such as G3 or G4, and the functionality of an NCU that controls connections with the public network 7, and conducts fax communication with the public network 7.

Figure 3:
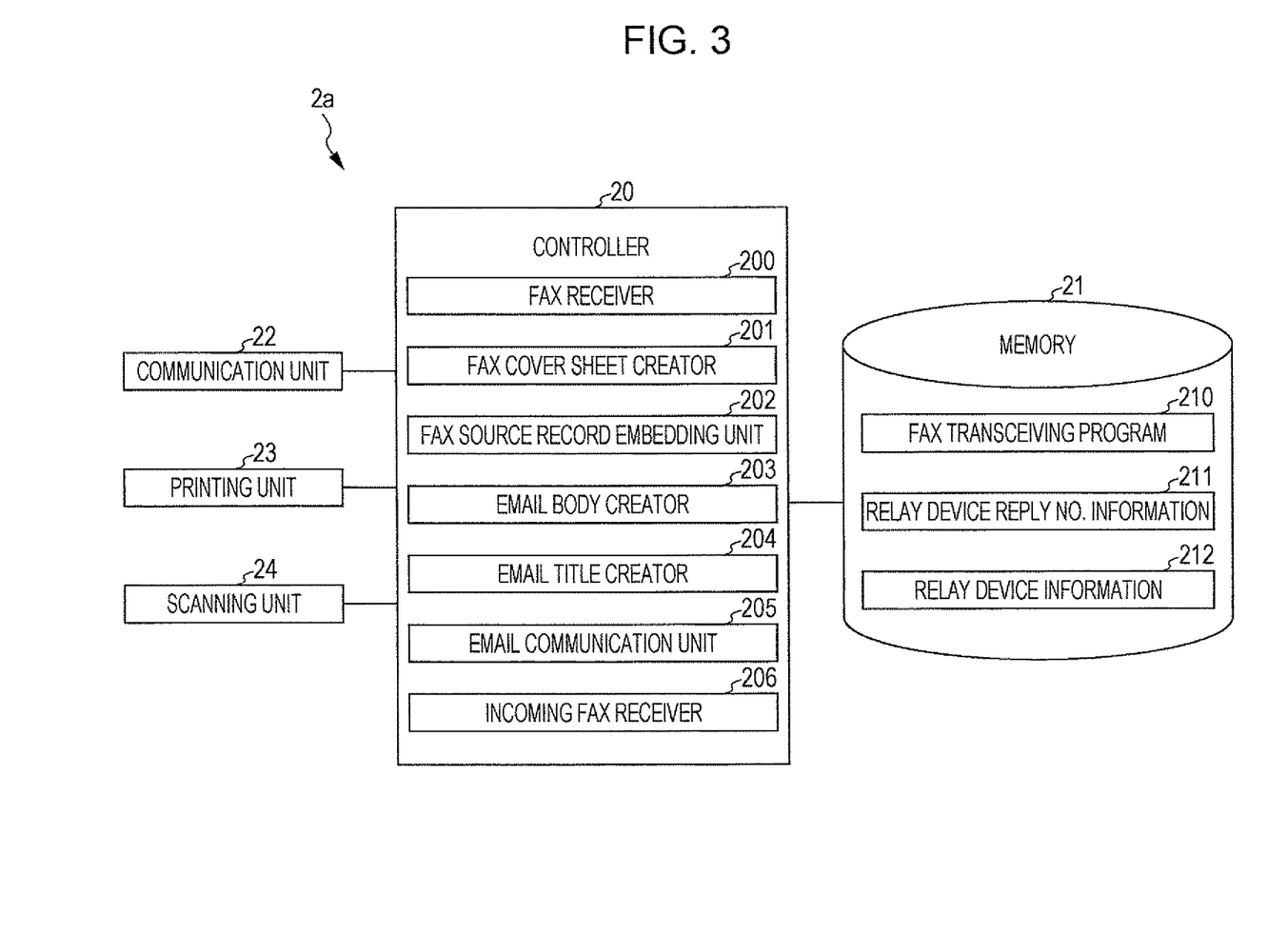
FIG. 3 is a block diagram illustrating an exemplary configuration of a client device.

FIG. 3 is a block diagram illustrating an exemplary configuration of the client devices 2a to 2c. Since the configuration of the client devices 2a to 2c is shared, the client device 2a will be described as a representative example.

The client device 2a is made up of a CPU or the like, and is equipped with a controller 20 that executes various programs, memory 21 made up of a memory medium such as flash memory that stores information, a communication unit 22 that communicates with external devices via the private network 4, a printing unit 23 that prints onto a paper sheet, and a scanning unit 24 that optically scans a paper sheet having information such as text and images written thereon. The client device 2a may additionally include a display that displays information such as text and images, and an operating unit used to operate the client device 2a.

By executing a fax transceiving program 210 discussed later, the controller 20 functions as a fax receiver 200, a fax cover sheet creator 201, a fax source record embedding unit 202, an email body creator 203, an email title creator 204, an email communication unit 205, an incoming fax receiver 206, and the like.

The fax receiver 200 receives a fax transmission request from the user of the client device 2a. Note that a fax transmission request is input together with a destination phone number as a result of the user operating an operating unit (not illustrated), while a document to be faxed is scanned by the scanning unit 24 to generate image information.

The fax cover sheet creator 201 creates a cover sheet on the basis of a fax transmission request and a destination phone number received by the fax receiver 200.

The fax source record embedding unit 202 embeds source information into image information, which represents a document received by the fax receiver 200.

The email body creator 203 creates the body text of an email to be transmitted to the relay device 1, on the basis of a fax transmission request and a destination phone number received by the fax receiver 200.

The email title creator 204 creates the title of an email to be transmitted to the relay device 1, on the basis of a fax transmission request and a destination phone number received by the fax receiver 200.

The email communication unit 205 transmits and receives email to and from the relay device 1 via the private network 4.

The incoming fax receiver 206 receives, via the private network 4, a fax saved to a sorting box corresponding to the client device 2a from among faxes temporarily saved in the relay device 1.

The memory 21 stores information such as the fax transceiving program 210 that causes the controller 20 to operate as the respective units 200 to 206 discussed above, relay device reply number information 211, and relay device information 212.

The relay device reply number information 211 is information that associates the IP addresses of relay devices to which the client device 2a is able to transmit fax transmission instructions with reply fax numbers corresponding to relay devices.

The relay device information 212 is information on preregistered IP addresses of relay devices to which the client device 2a is able to transmit fax transmission instructions.

Note that not all of the respective units 100 to 106 of the relay device 1 described in FIG. 2 and the respective units 200 to 206 of the client device 2a described in FIG. 3 may be provided. It is sufficient to provide the units used in the operation of each of the exemplary embodiments described hereinafter.

(Operation of communication system)

Hereinafter, operation of a communication system 5 according to the first exemplary embodiment will be described with reference to FIGS. 1 to 4C, with the description divided into (1) basic operation, (2) cover sheet creation and source record embedding operation, and (3) fax transmission operation.

(1) Basic operation

First, a user of a client device 2a operates an operating unit (not illustrated) of the client device 2a, and prepares a fax.

The fax receiver 200 of the client device 2a starts receiving a fax transmission request in response to the user operations, and receives a destination phone number while also prompting the user to place a document to be faxed on a platen of the scanning unit 24 of the client device 2a.

The user inputs a destination phone number, and in addition, places a document on the platen and operates the operating unit to cause the scanning unit 24 to scan the document.

The fax receiver 200 of the client device 2a optically scans the document with the scanning unit 24 and generates image information.

Figure 4A:
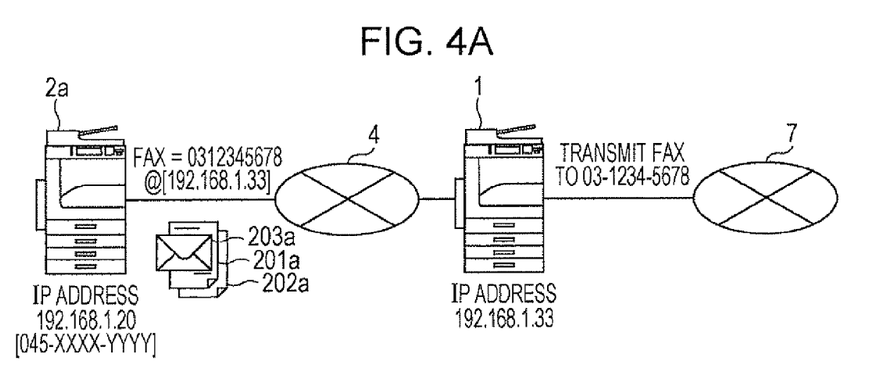
FIGS. 4A to 4C are schematic views for illustrating fax transmission operations.
Figure 4B:
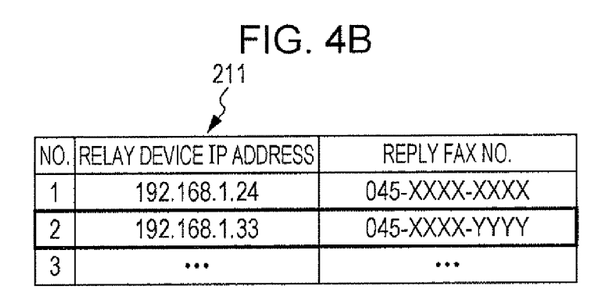
Figure 4C:
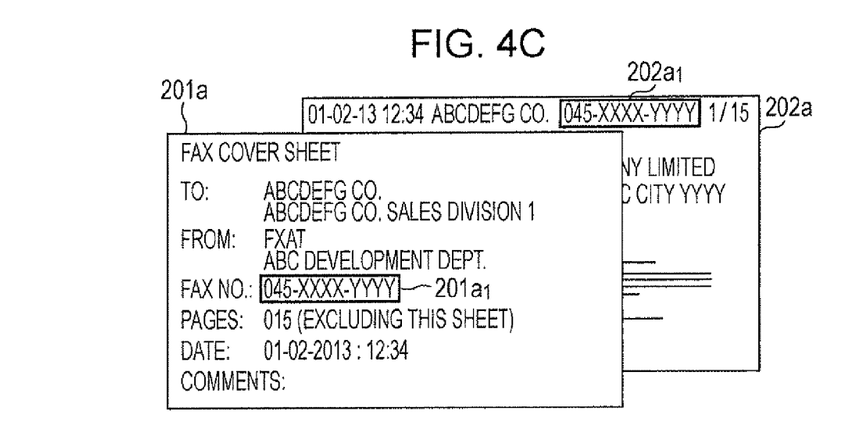

FIGS. 4A to 4C are schematic views for illustrating fax transmission operations.

As illustrated in FIG. 4A, the client device 2a embeds a source record into the generated image information 202a of a document as discussed later, and attaches the image information 202a together with a cover sheet 201a to an email 203a with the title "FAX=0312345678@[192.168.1.33]". By transmitting this email, the client device 2a issues fax transmission instructions to the relay device 1.

Hereinafter, cover sheet 201a creation operation and source record embedding operation with respect to image information 202a will be described in detail. After that, email body and title creation operation and email 203a transmission operation will be described in detail.

(2) Cover sheet creation and source record embedding operation

First, the fax cover sheet creator 201 creates a cover sheet 201a on the basis of a fax transmission request and a destination phone number received by the fax receiver 200.

When creating a cover sheet 201a, the fax cover sheet creator 201 references relay device reply number information 211 illustrated in FIG. 4B.

In the example illustrated in FIG. 4A, the client device 2a transmits a fax via the relay device 1, and since the IP address of the relay device 1 is "192.168.1.33", the reply fax number associated with the IP address "192.168.1.33" in the relay device reply number information 211 becomes "045-XXXX-YYYY". Note that the reply fax number "045-XXXX-YYYY" is a DID phone number for the client device 2a set in the relay device 1. Meanwhile, the reply fax number "045-XXXX-XXXX" is a DID phone number for a client device 2a set in another relay device corresponding to the IP address "192.168.1.24".

Note that a reply fax number is a phone number used when replying to a fax from an external device after the external device receives the image information of a faxed document. Also, in the case where the relay device 1 with a corresponding number has received a fax, the image information of the received document is saved in a sorting box corresponding to the client device 2a in memory.

As illustrated in FIG. 4C, the fax cover sheet creator 201 creates a cover sheet 201a with "045-XXXX-YYYY" input into a fax number field $201a_1$.

In addition, as illustrated in FIG. 4C, the fax source record embedding unit 202 embeds the reply fax number "045-XXXX-YYYY" into a header field $202a_1$ of the image information 202a.

(3) Fax transmission operation

Next, the email body creator 203 creates the body text of an email 203a to be transmitted to the relay device 1, on the basis of a fax transmission request and a destination phone number received by the fax receiver 200. In the first exemplary embodiment, no particular text or other information is input into the email body.

Also, the email title creator 204 creates the title of the email 203a to be transmitted to the relay device 1, on the basis of a fax transmission request and a destination phone number received by the fax receiver 200. In the example illustrated in FIG. 4A, since the phone number of the fax destination is "03-1234-5678" and the IP address of the relay device 1 is "192.168.1.33", the email title is set to "FAX=0312345678@ [192.168.1.33]".

Next, the email communication unit 205 attaches the cover sheet 201a created by the fax cover sheet creator 201 and the image information 202a with a source record embedded by the fax source record embedding unit 202 to the email 203a created by the email body creator 203 and the email title creator 204, and transmits the resulting email to the relay device 1.

The email communication unit 100 of the relay device 1 receives the email 203a transmitted by the client device 2a, and the email title analyzer 101 analyzes the email title "FAX=0312345678@[192.168.1.33]" and recognizes that "03-1234-5678" is the destination fax number.

Next, the fax communication controller 105 transmits a fax of the cover sheet 201a and the image information 202a attached to the email 203a to "03-1234-5678".

As an example, in the case where the fax number of the external device 6a is "03-1234-5678", the external device 6a receives the cover sheet 201a and the image information 202a via the public network 7, and outputs the received information by printing the information onto paper sheets or the like.

From the paper sheets upon which are printed the cover sheet 201a and the image information 202a, the user of the external device 6a checks the entry "045-XXXX-YYYY" corresponding to the fax number field $201a_1$ or the header field $202a_1$, and transmits a fax to that phone number if a reply is required.

Consequently, if the image information of a reply document is faxed to that phone number in order to send a reply from the external device 6a, the fax communication controller 105 of the relay device 1 receives a fax of the image information of the reply document, while the incoming fax sorter 106 saves the image information of the reply document into a sorting box corresponding to the client device 2a, and additionally transmits the image information of the reply document to the client device 2a at a predetermined timing.

[Second Exemplary Embodiment]

Compared to the first exemplary embodiment, the second exemplary embodiment differs in that the client device 2a includes relay device information 212 rather than relay device reply number information 211.

(Operation of communication system)

Hereinafter, operation of a communication system 5 according to the second exemplary embodiment will be described with reference to FIGS. 1 to 3 and FIG. 5, with the description divided into (1) basic operation, (2) cover sheet creation and source record embedding operation, and (3) fax transmission operation. Note that the description of operation similar to that of the first exemplary embodiment will be reduced or omitted.

(1) Basic operation

Figure 5A:
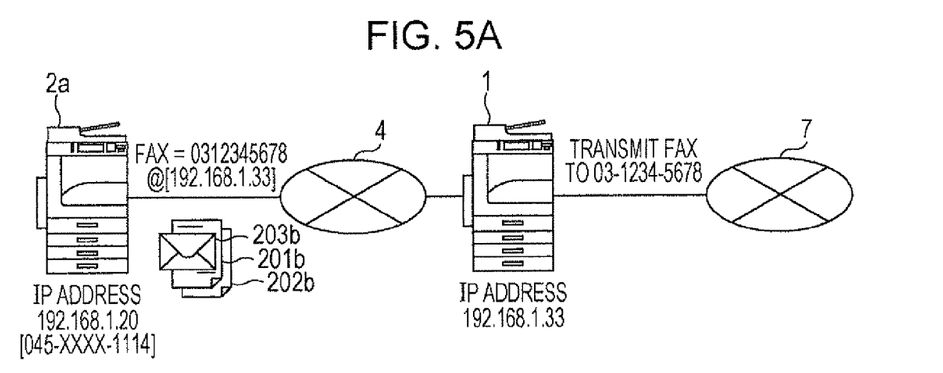
FIGS. 5A to 5C are schematic views for illustrating fax transmission operations.
Figure 5B:
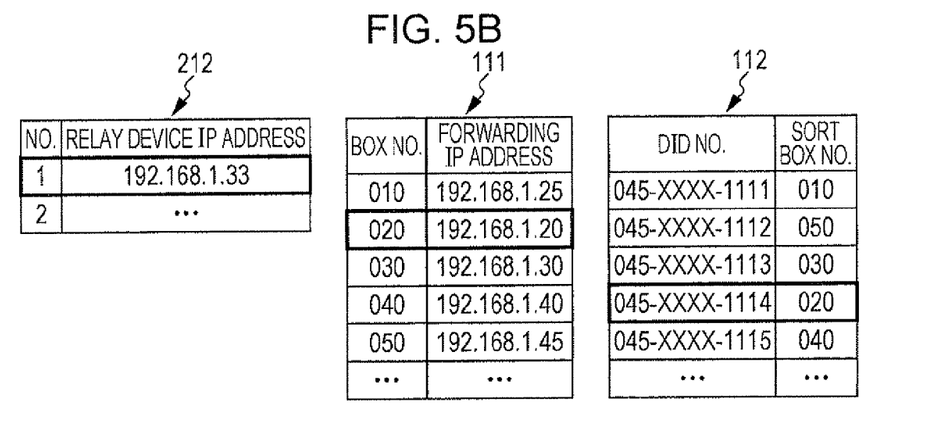
Figure 5C:
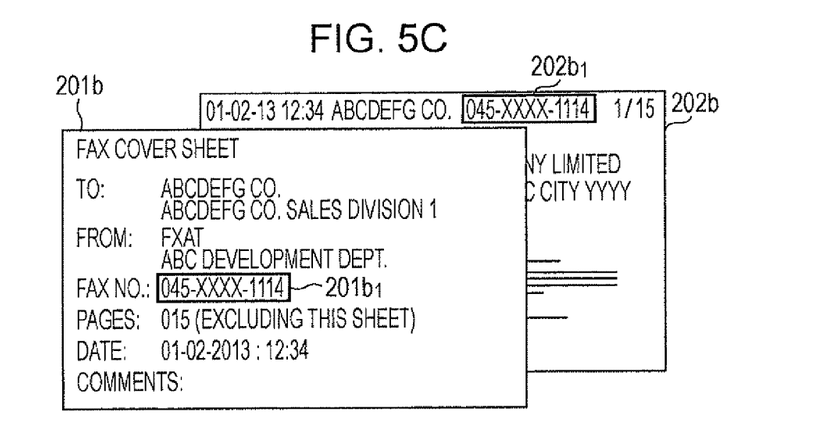

FIGS. 5A to 5C are schematic views for illustrating fax transmission operations.

As illustrated in FIG. 5A, the client device 2a embeds a source record into the generated image information 202b of a document as discussed later, and attaches the image information 202b together with a cover sheet 201b to an email 203b with the title "FAX=0312345678@[192.168.1.33]". By transmitting this email, the client device 2a issues fax transmission instructions to the relay device 1.

Hereinafter, cover sheet 201b creation operation and source record embedding operation with respect to image information 202b will be described in detail.

(2) Cover sheet creation and source record embedding operation

First, the fax cover sheet creator 201 creates a cover sheet 201b on the basis of a fax transmission request and a destination phone number received by the fax receiver 200.

When creating a cover sheet 201b, the fax cover sheet creator 201 references relay device information 212 illustrated in FIG. 5B.

In the example illustrated in FIG. 5A, the client device 2a transmits a fax via the relay device 1, and the IP address of the relay device 1 is "192.168.1.33".

Consequently, the fax cover sheet creator 201 communicates with the relay device 1 at the IP address "192.168.1.33", and transmits a query request for a fax number to be used as a reply number. At this point, the fax cover sheet creator 201 transmits the query request, together with the client device 2a's own IP address "192.168.1.20", to the relay device 1.

Upon receiving the query request from the client device 2a, the relay device 1 references box forwarding information 111 indicated in FIG. 5B, and obtains a box number "020" corresponding to the IP address "192.168.1.20" of the client device 2a.

Next, the relay device 1 references DID number sorting box information 112 illustrated in FIG. 5B, and obtains a DID number "045-XXXX-1114" corresponding to the box number "020".

Next, the relay device 1 transmits the DID number "045-XXXX-1114" to the client device 2a.

Next, the fax cover sheet creator 201 uses the DID number "045-XXXX-1114" received from the relay device 1 to create a cover sheet 201b with "045-XXXX-1114" input into a fax number field $201b_1$, as illustrated in FIG. 5C.

In addition, as illustrated in FIG. 5C, the fax source record embedding unit 202 embeds the reply fax number "045-XXXX-1114" into a header field $202b_1$ of the image information 202b.

In one exemplary configuration, the client device requests the relay device for the information on the public network line, the relay device transmits the information on the public network link to the client device in response to a request from the client device, the client device receives the information on the public network line from the relay device, adds the information on the public network line to the image information, and issues facsimile transmission instructions to the relay device, and the relay device transmits a facsimile of the image information with the added information on the public network line in response to the facsimile transmission instructions from the client device.

(3) Fax transmission operation

Operation of the email body creator 203, the email title creator 204, and the email communication unit 205, as well as operation of the relay device 1 upon receiving an email, are similar to that of the first exemplary embodiment, and thus further description will be omitted.

[Third Exemplary Embodiment]

Compared to the first exemplary embodiment, the third exemplary embodiment differs in that the relay device 1 rather than the client device 2a embeds a cover sheet and a source record.

(Operation of communication system)

Hereinafter, operation of a communication system 5 according to the third exemplary embodiment will be described with reference to FIGS. 1 to 3 and FIG. 6, with the description divided into (1) basic operation, (2) email creation operation, and (3) cover sheet creation and source record embedding operation. Note that the description of operation similar to that of the first exemplary embodiment will be reduced or omitted.

(1) Basic operation

First, a user of a client device 2a operates an operating unit (not illustrated) of the client device 2a, and prepares a fax.

The fax receiver 200 of the client device 2a starts receiving a fax transmission request in response to the user operations, and receives a destination phone number while also prompting the user to select whether or not to attach a cover sheet and whether or not to embed a source record, and to place a document to be faxed on a platen of the scanning unit 24 of the client device 2a.

The user inputs a destination phone number, and in addition, selects to attach a cover sheet and embed a source record, places a selected document on the platen, and operates the operating unit to cause the scanning unit 24 to scan the document.

The fax receiver 200 of the client device 2a optically scans the document with the scanning unit 24 and generates image information.

FIGS. 6A to 6D are schematic views for illustrating fax transmission operations.

Figure 6A:
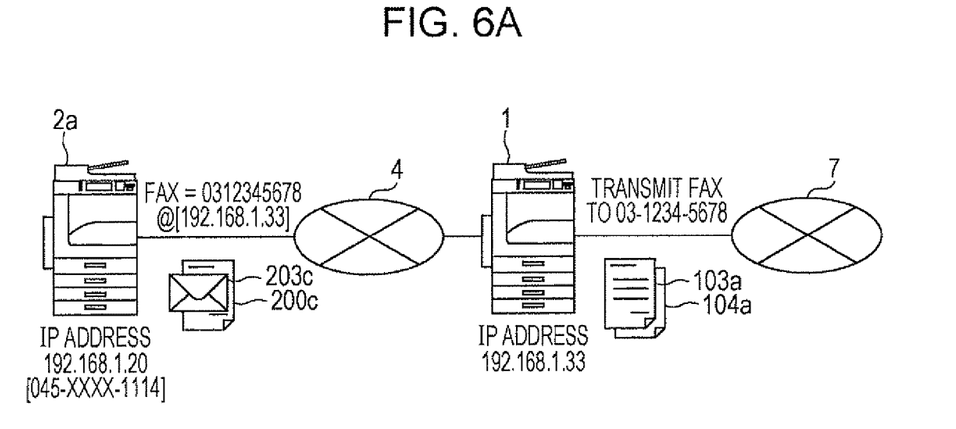
FIGS. 6A to 6D are schematic views for illustrating fax transmission operations.

As illustrated in FIG. 6A, the client device 2a attaches the image information 200c of the document to an email 203c with the title "FAX=0312345678@[192.168.1.33]". By transmitting this email, the client device 2a issues fax transmission instructions to the relay device 1. Note that the body text of the email 203c contains instructions regarding cover sheet creation and source record embedding. The relay device 1 creates and faxes a cover sheet 103a and image information 104a with an embedded source record according to the fax transmission instructions from the client device 2a.

Hereinafter, email 203c creation operation will be described in detail, and after that, cover sheet 103a and image information 104a creation operation will be described in detail.

(2) Email creation operation

Figure 6B:
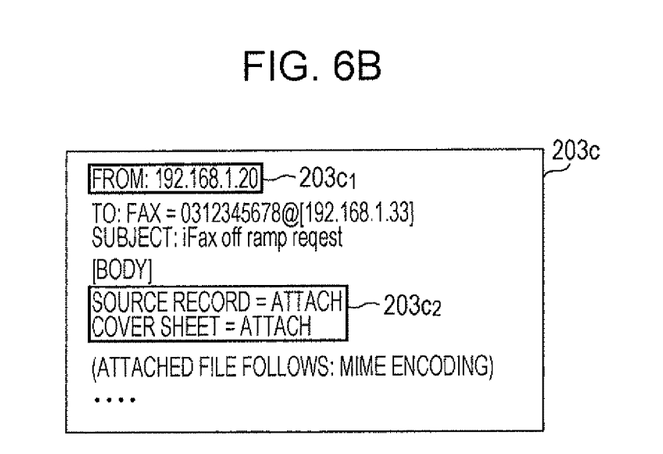

As illustrated in FIG. 6B, the email body creator 203 inputs information indicating "Source record=attach" and "Cover sheet=attach" into a cover sheet/source record setting field $203c_2$ in the body text of the email 203c, on the basis of information received by the fax receiver 200.

Also, as illustrated in FIG. 6B, the email title creator 204 sets the title of the email 203c to "iFax off ramp request", sets the destination to "FAX=0312345678@[192.168.1.33]", and sets the sender address to the IP address of the client device, "192.168.1.20".

Next, the email communication unit 205 attaches image information 200c to the email 203c, and transmits the resulting email to the relay device 1 via the private network 4.

(3) Cover sheet creation and source record embedding operation

The email communication unit 100 of the relay device 1 receives the email 203c transmitted from the client device 2a, and the email title analyzer 101 analyzes the email title "FAX=0312345678@[192.168.1.33]" and recognizes that "03-1234-5678" is the destination fax number.

Next, from the statements "Source record=attach" and "Cover sheet=attach" in the cover sheet/source record setting field $203c_2$ in the body text of the email 203c, the email body analyzer 102 generates a cover sheet, and instructs the fax cover sheet creator 103 and the fax source record embedding unit 104 to embed a source record.

In addition, the email title analyzer 101 reads the sender "192.168.1.20", and passes this sender information to the fax cover sheet creator 103 and the fax source record embedding unit 104.

Figure 6C:
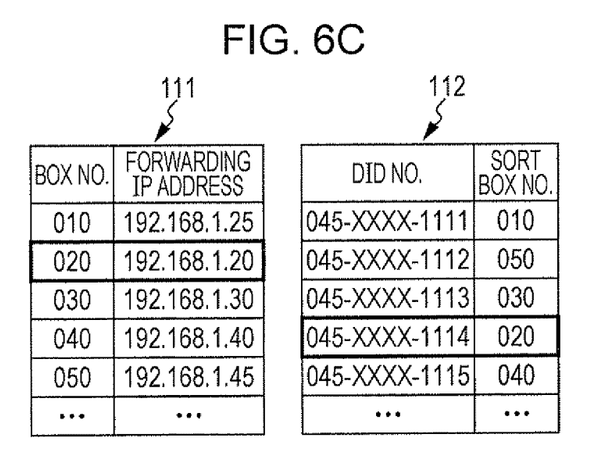

First, the fax cover sheet creator 103 references box forwarding information 111 indicated in FIG. 6C, and obtains a box number "020" corresponding to the IP address "192.168.1.20" of the client device 2a.

Next, the fax cover sheet creator 103 references DID number sorting box information 112 illustrated in FIG. 6C, and obtains a DID number "045-XXXX-1114" corresponding to the box number "020".

Next, as illustrated in FIG. 4D, the fax cover sheet creator 103 creates a cover sheet 103a with "045-XXXX-1114" input into a fax number field $103a_1$.

Figure 6D:
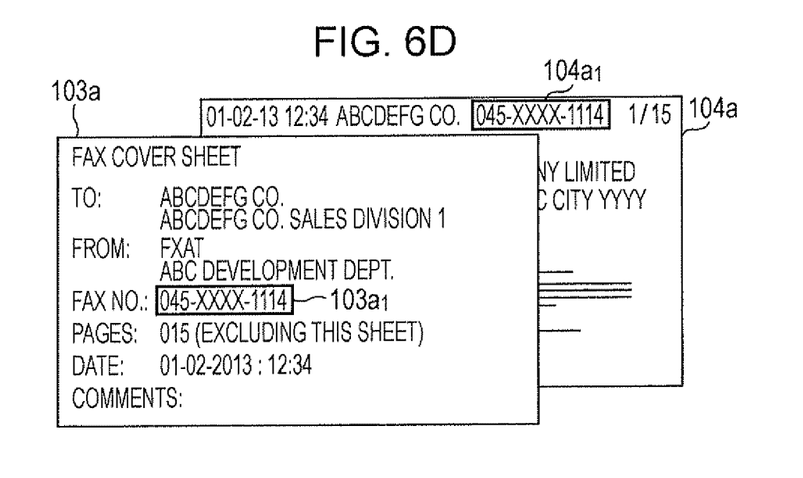

In addition, as illustrated in FIG. 6D, the fax source record embedding unit 202 embeds the reply fax number "045-XXXX-1114" into a header field $104a_1$ of the image information 200c, resulting in image information 104a.

The fax communication controller 105 subsequently faxes the cover sheet 103a and the image information 104a, but since the operation is similar to that of the first exemplary embodiment, description is omitted.

[Fourth Exemplary Embodiment]

Compared to the third exemplary embodiment, the fourth exemplary embodiment differs in that destination and source information is added to the email body text.

(Operation of communication system)

Hereinafter, operation of a communication system 5 according to the fourth exemplary embodiment will be described with reference to FIGS. 1 to 3 and FIG. 7, with the description divided into (1) basic operation, (2) email creation operation, and (3) cover sheet creation and source record embedding operation. Note that the description of operation similar to that of the third exemplary embodiment will be reduced or omitted.

(1) Basic Operation

First, a user of a client device 2a operates an operating unit (not illustrated) of the client device 2a, and prepares a fax.

The fax receiver 200 of the client device 2a starts receiving a fax transmission request in response to the user operations, and receives a destination phone number while also prompting the user to select whether or not to attach a cover sheet and whether or not to embed a source record, to additionally add destination and source statements, and to place a document to be faxed on a platen of the scanning unit 24 of the client device 2a.

The user inputs a destination phone number, selects to attach a cover sheet and embed a source record, additionally adds destination and source information statements, places a selected document on the platen, and operates the operating unit to cause the scanning unit 24 to scan the document. Note that the additional destination and source statements may be selected from preregistered information, or may be newly input.

The fax receiver 200 of the client device 2a optically scans the document with the scanning unit 24 and generates image information.

FIGS. 7A to 7D are schematic views for illustrating fax transmission operations.

Figure 7A:
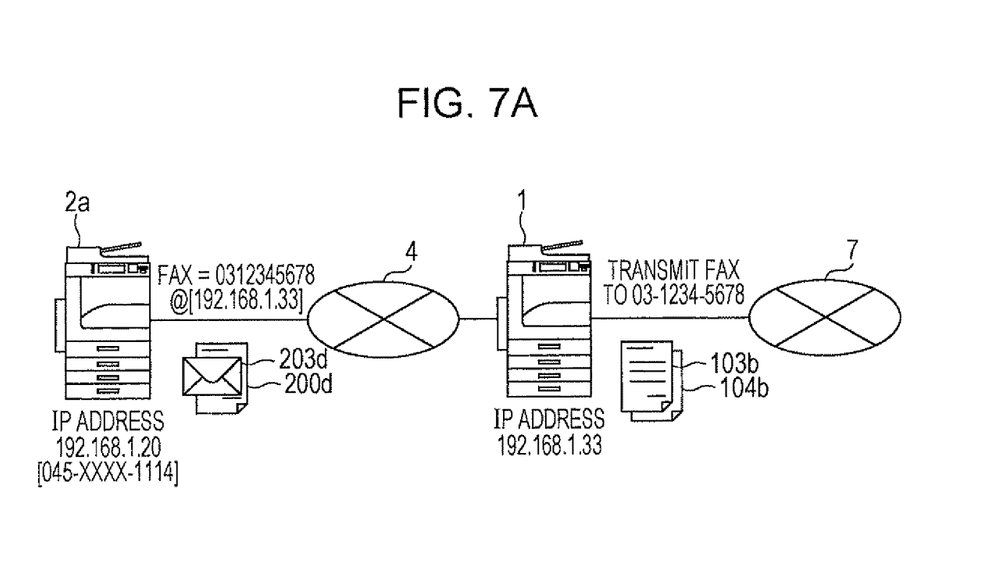
FIGS. 7A to 7D are schematic views for illustrating fax transmission operations.

As illustrated in FIG. 7A, the client device 2a attaches the image information 200d of the document to an email 203d with the title "FAX=0312345678@[192.168.1.33]". By transmitting this email, the client device 2a issues fax transmission instructions to the relay device 1. The relay device 1 creates and faxes a cover sheet 103b and image information 104b with an embedded source record according to the fax transmission instructions from the client device 2a.

Hereinafter, email 203d creation operation will be described in detail, and after that, cover sheet 103b and image information 104b creation operation will be described in detail.

(2) Email creation operation

Figure 7B:
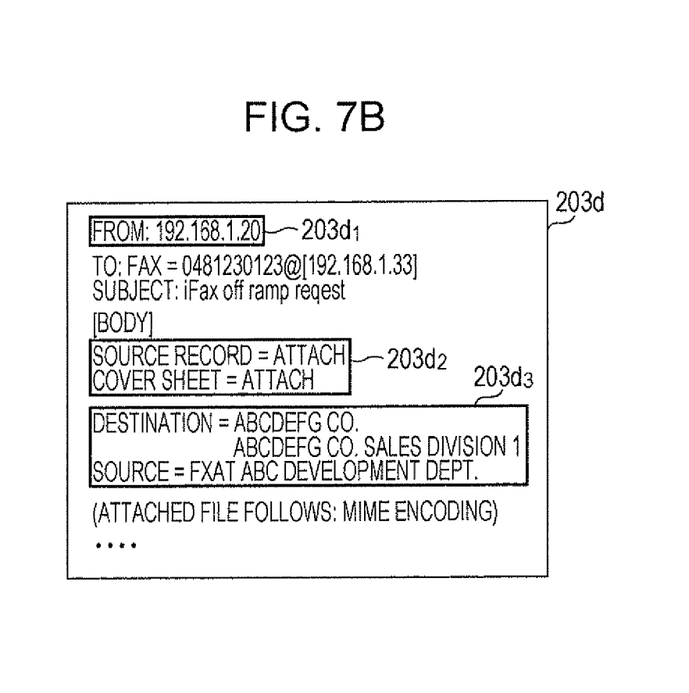

As illustrated in FIG. 7B, the email body creator 203 inputs information indicating "Source record=attach" and "Cover sheet=attach" into a cover sheet/source record setting field $203d_2$, as well as information indicating "Destination=ABCDEFG Co. ABCDEFG Sales Division 1" and "Source=FXAT ABC Development Dept." into a destination/source input field $203d_3$, in the body of the email 203c, on the basis of information received by the fax receiver 200.

Also, as illustrated in FIG. 7B, the email title creator 204 sets the title of the email 203d to "iFax off ramp request", sets the destination to "FAX=0312345678@[192.168.1.33]", and sets the sender address to the IP address of the client device, "192.168.1.20".

Next, the email communication unit 205 attaches image information 200d to the email 203d, and transmits the resulting email to the relay device 1 via the private network 4.

(3) Cover sheet creation and source record embedding operation

The email communication unit 100 of the relay device 1 receives the email 203d transmitted from the client device 2a, and the email title analyzer 101 analyzes the email title "FAX=0312345678@[192.168.1.33]" and recognizes that "03-1234-5678" is the destination fax number.

Next, from the statements "Source record=attach" and "Cover sheet=attach" in the cover sheet/source record setting field $203d_2$ in the body text of the email 203d, the email body analyzer 102 generates a cover sheet, and additionally instructs the fax cover sheet creator 103 and the fax source record embedding unit 104 to input relevant destination and source statements from the "Destination=ABCDEFG Co. ABCDEFG Sales Division 1" and "Source=FXAT ABC Development Dept." statements in the destination/source input field $203d_3$.

In addition, the email title analyzer 101 reads the sender "192.168.1.20", and passes this sender information to the fax cover sheet creator 103 and the fax source record embedding unit 104.

Figure 7C:
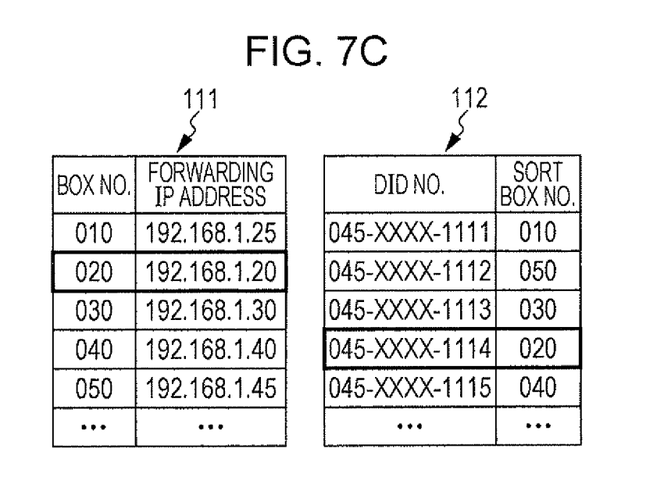

First, the fax cover sheet creator 103 references box forwarding information 111 indicated in FIG. 7C, and obtains a box number "020" corresponding to the IP address "192.168.1.20" of the client device 2a.

Next, the fax cover sheet creator 103 references DID number sorting box information 112 illustrated in FIG. 7C, and obtains a DID number "045-XXXX-1114" corresponding to the box number "020".

Figure 7D:
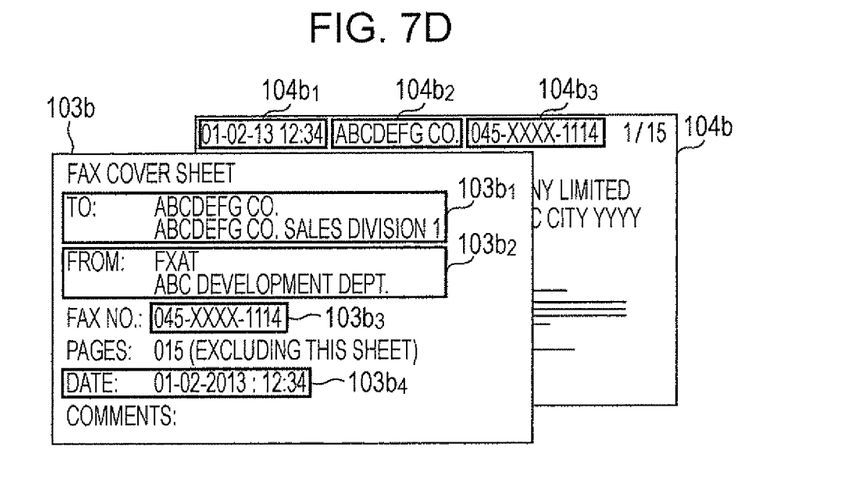

Next, as illustrated in FIG. 7D, the fax cover sheet creator 103 creates a cover sheet 103b with "045-XXXX-1114" input into a fax number field $103b_3$. In addition, the fax cover sheet creator 103 inputs "ABCDEFG Co. ABCDEFG Sales Division 1" into a destination field $103b_1$ and inputs "FXAT ABC Development Dept." into a source field $103b_2$ of the cover sheet 103b, while also inputting the time of transmission from the relay device 1 "2013-01-02; 12:34" into a transmission time/date field $103b_4$.

In addition, as illustrated in FIG. 7D, the fax source record embedding unit 202 embeds the reply fax number "045-XXXX-1114" into a header field $104b_3$ of the image information 200d, resulting in image information 104b. Also, the fax source record embedding unit 202 embeds the transmission time/date "2013-01-02; 12:34" into a header field $104b_1$ and the destination "ABCDEFG Co." into a header field $104b_2$ of the image information $104b$.

The fax communication controller 105 subsequently faxes the cover sheet $103b$ and the image information $104b$, but since the operation is similar to that of the first exemplary embodiment, description is omitted.

[Fifth Exemplary Embodiment]

Compared to the second exemplary embodiment, the fifth exemplary embodiment differs in that the PC $3a_1$ issues fax transmission instructions, and the client device $2a$ receives image information of a document transmitted as a reply resulting from the fax transmission instructions.

(Operation of communication system)

Hereinafter, operation of a communication system 5 according to the fifth exemplary embodiment will be described with reference to FIGS. 1 to 3 and FIG. 8, with the description divided into (1) basic operation, (5) cover sheet creation and source record embedding operation, and (3) fax transmission operation. Note that the description of operation similar to that of the second exemplary embodiment will be reduced or omitted.

(1) Basic Operation

First, a user of a PC $3a_1$ operates an operating unit (not illustrated) of the PC $3a_1$, and prepares a fax.

The PC $3a_1$ starts receiving a fax transmission request in response to the user operations, and receives a destination phone number while also prompting the user to select image information corresponding to a document to be faxed from among image information being saved on the PC $3a_1$.

The user inputs a destination phone number, an in addition, operates the operating unit to select image information forming the document.

Figure 8A:
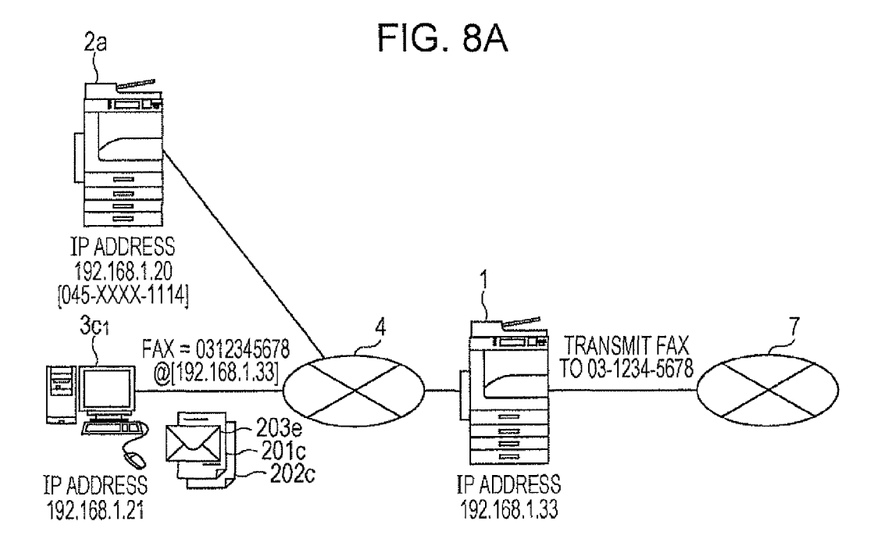
FIGS. 8A to 8C are schematic views for illustrating fax transmission operations.
Figure 8B:
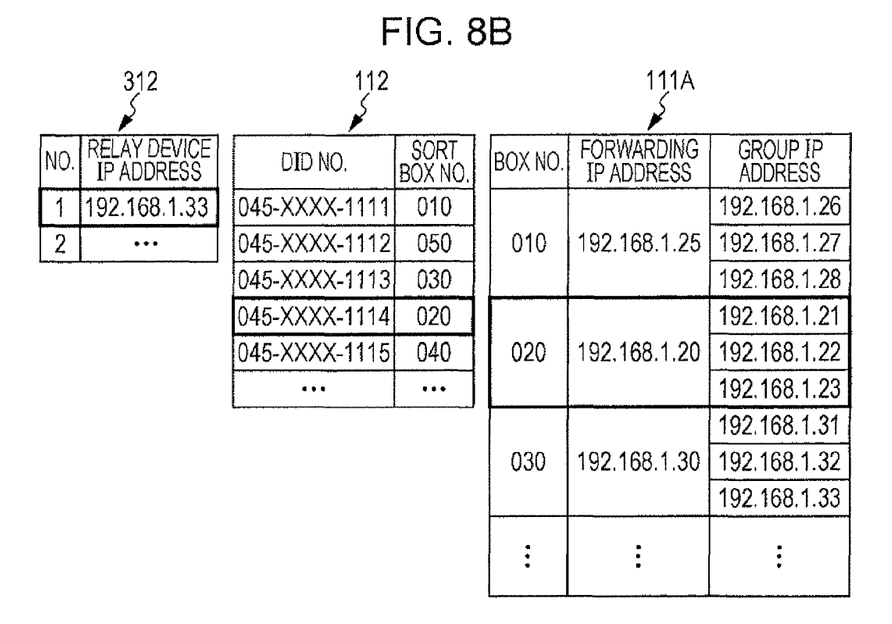
Figure 8C:
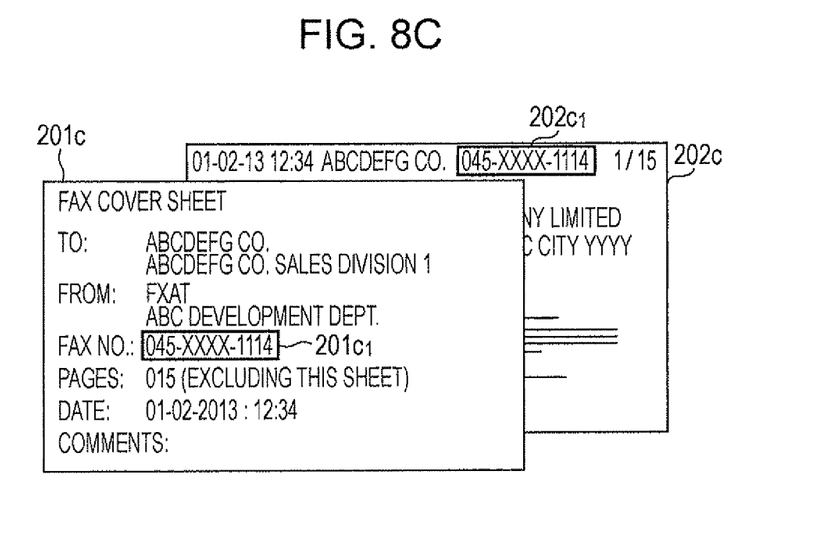

FIGS. 8A to 8C are schematic views for illustrating fax transmission operations.

As illustrated in FIG. 8A, the PC $3a_1$ embeds a source record into the selected image information $202c$ of a document as discussed later, and attaches the image information $202c$ together with a cover sheet $201c$ to an email $203e$ with the title "FAX=0312345678@[192.168.1.33]". By transmitting this email, the PC $3a_1$ issues fax transmission instructions to the relay device 1.

Hereinafter, cover sheet $201c$ creation operation and source record embedding operation with respect to image information $202c$ will be described in detail.

(2) Cover sheet creation and source record embedding operation

First, the PC $3a_1$ creates a cover sheet $201c$ on the basis of a received fax transmission request and destination phone number.

When creating a cover sheet $201c$, the PC $3a_1$ references relay device information 312 illustrated in FIG. 8B.

In the example illustrated in FIG. 8A, the PC $3a_1$ transmits a fax via the relay device 1, and the IP address of the relay device 1 is "192.168.1.33".

Consequently, the PC $3a_1$ communicates with the relay device 1 at the IP address "192.168.1.33", and transmits a query request for a fax number to be used as a reply number. At this point, the PC $3a_1$ transmits the query request, together with the PC $3a_1$'s own IP address "192.168.1.21", to the relay device 1.

Upon receiving the query request from the PC $3a_1$, the relay device 1 references box forwarding information 111A indicated in FIG. 8B, and obtains a box number "020" corresponding to the case that takes the IP address "192.168.1.21" of the PC $3a_1$ as a grouped IP address. Note that grouped IP addresses herein refer to the IP addresses of devices that have been grouped around a client device $2a$ with the IP address [192.168.1.20]. For example, the PC $3a_1$ may be grouped under the client device $2a$ because the client device $2a$ and the PC $3a_1$ are installed on the same floor of the same building, and because the PC $3a_1$ lacks printing functions.

Next, the relay device 1 references DID number sorting box information 112 illustrated in FIG. 8B, and obtains a DID number "045-XXXX-1114" corresponding to the box number "020". This is a phone number corresponding to the client device $2a$.

Next, the relay device 1 transmits the DID number "045-XXXX-1114" to the PC $3a_1$.

Next, the PC $3a_1$ uses the DID number "045-XXXX-1114" received from the relay device 1 to create a cover sheet $201c$ with "045-XXXX-1114" input into a fax number field $201c_1$, as illustrated in FIG. 8C.

In addition, as illustrated in FIG. 8C, the PC $3a_1$ embeds the reply fax number "045-XXXX-1114" into a header field $202c_1$ of the image information $202c$.

(3) Fax transmission operation

Email transmission operation of the PC $3a_1$ as well as operation of the relay device 1 upon receiving an email are similar to that of the second exemplary embodiment, and thus further description will be reduced or omitted.

As an example, in the case where the fax number of the external device $6a$ is "03-1234-5678", the external device $6a$ receives the cover sheet $201c$ and the image information $202c$ via the public network 7, and outputs the received information by printing the information onto paper sheets or the like.

From the paper sheets upon which are printed the cover sheet $201c$ and the image information $202c$, the user of the external device $6a$ checks the entry "045-XXXX-YYYY" corresponding to the fax number field $201c_1$ or the header field $202c_1$, and transmits a fax to that phone number if a reply is required.

Consequently, if the image information of a reply document is faxed to that phone number in order to send a reply from the external device $6a$, the fax communication controller 105 of the relay device 1 receives a fax of the image information of the reply document, while the incoming fax sorter 106 saves the image information of the reply document into a sorting box corresponding to the client device $2a$, while also transmitting the image information of the reply document to the client device $2a$ at a predetermined timing.

Upon receiving the image information of a document, the client device $2a$ prints the image information of the document, and the user of the PC $3a_1$ moves to the client device $2a$ and receives the printed document.

[Other Exemplary Embodiments]

Note that the present invention is not limited to the foregoing exemplary embodiments, and that various modifications are possible within a scope that does not depart from the principal matter of the present invention.

Furthermore, the foregoing fax transceiving programs 110 and 210 may also be provided by being stored on a storage medium such as a CD-ROM, or by being downloaded to memory inside a device from a device such as a server connected to a network such as the Internet. In addition, all or part of the respective units 100 to 106 and the respective units 200 to 206 may be realized by hardware such as an ASIC. Note that the order of the respective steps indicated in the operational description of the foregoing exemplary embodiments may also be modified, and steps may also be added or removed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication system comprising:
a client device that does not include facsimile transmission functions; and
a relay device that is communicably connected to the client device via a private network while also being communicably connected to an external device via a public network, includes facsimile transceiving functions that transmit and receive facsimiles via a public network line associated with the client device, wherein
the client device requests the relay device for information on the public network line,
the relay device transmits the information on the public network line to the client device in response to the request from the client device,
the client device receives the information on the public network line from the relay device, adds the information on the public network line to image information, and issues facsimile transmission instructions to the relay device, and
in response to the facsimile transmission instructions received from the client device via the private network, the relay device transmits to the external device a facsimile of the image information with added information on the public network line associated with the private network.

2. The communication system according to claim 1, wherein
the client device includes the information on the public network line, adds the information on the public network line to the image information, and instructs the relay device to transmit a facsimile of the image information, and
the relay device transmits a facsimile of the image information with the added information on the public network line in response to the facsimile transmission instructions from the client device.

3. The communication system according to claim 2, wherein
a public network line associated with another client device other than the client device is used as a public network line.

4. The communication system according to claim 1, wherein
the client device issues facsimile transmission instructions to the relay device, together with instructions to attach the information on the public network line to the image information, and
the relay device adds the information on the public network line to the image information and transmits a facsimile of the image information with the added information in response to the instructions to attach the information on the public network line and the facsimile transmission instructions.

5. The communication system according to claim 4, wherein
the client device issues facsimile transmission instructions, together with instructions to attach facsimile transmission destination and source information, in addition to instructions to attach information on the public network line.

6. The communication system according to claim 5, wherein
a public network line associated with another client device other than the client device is used as a public network line.

7. The communication system according to claim 1, wherein
a public network line associated with another client device other than the client device is used as a public network line.

8. The communication system according to claim 1, wherein
a public network line associated with another client device other than the client device is used as a public network line.

9. The communication system according to claim 1, wherein
a public network line associated with another client device other than the client device is used as a public network line.

10. A relay device comprising:
a communication unit that communicates with a client device via a private network;
a facsimile communication unit, communicably connected to an external device via a public network, that transmits and receives facsimiles via a public network line associated with the client device; and
a receiving unit that receives facsimile transmission instructions for image information from the client device via the private network, wherein
the client device requests the relay device for information on the public network line,
the communication unit transmits the information on the public network line to the client device in response to the request from the client device,
the client device receives the information on the public network line from the relay device, adds the information on the public network line to the image information, and issues facsimile transmission instructions to the relay device, and
the facsimile communication unit transmits to the external device a facsimile of the image information with added information on the public network line associated with the private network in response to the facsimile transmission instructions received by the receiving unit.

11. A non-transitory computer readable medium storing a program causing a computer to execute a process for transmitting and receiving facsimiles, the process comprising:
communicating with a client device via a private network;
transmitting and receiving facsimiles to and from an external device communicably connected via a public network, via a public network line associated with the client device;
receiving facsimile transmission instructions for image information from the client device via the private network, wherein the client device requests information on the public network line; and
transmitting the information on the public network line to the client device in response to the request from the client device, wherein the client device receives the information on the public network line, adds the information on the public network line to the image information, and issues facsimile transmission instructions, and a facsimile of the image information with added information on the public network line associated with the private network is transmitted to the external device in response to the received facsimile transmission instructions.

* * * * *